(12) United States Patent
Hall et al.

(10) Patent No.: US 12,490,859 B2
(45) Date of Patent: Dec. 9, 2025

(54) STUFFED WAFFLE UTENSIL (71) Applicant: National Presto Industries, Inc., Eau Claire, WI (US)

(72) Inventors: Russell W Hall, Eau Claire, WI (US); Michael R Berge, Eau Claire, WI (US)

(73) Assignee: National Presto Industries, Inc., Eau Claire, WI (US)

( * ) Notice: Subject to any disclaimer, the term of this patent is extended or adjusted under 35 U.S.C. 154(b) by 816 days.

(21) Appl. No.: 17/342,762

(22) Filed: Jun. 9, 2021

(65) Prior Publication Data
US 2021/0386241 A1 Dec. 16, 2021

Related U.S. Application Data (60) Provisional application No. 63/038,598, filed on Jun. 12, 2020.

(51) Int. Cl.
*A47J 37/06* (2006.01)
*A21D 13/31* (2017.01)
*A21D 13/36* (2017.01)

(52) U.S. Cl.
CPC ........... *A47J 37/0611* (2013.01); *A21D 13/31* (2017.01); *A21D 13/36* (2017.01)

(58) Field of Classification Search
CPC ....... A47J 37/0611; A21D 13/31; A21D 13/36
See application file for complete search history.

(56) References Cited

U.S. PATENT DOCUMENTS

| 10,687,665 | B1* | 6/2020 | Bradford | A47J 37/0611 |
| 2008/0105137 | A1* | 5/2008 | Genslak | A47J 37/0611 99/376 |
| 2013/0200081 | A1* | 8/2013 | Wilkinson | A21B 3/137 220/573.1 |
| 2014/0178550 | A1* | 6/2014 | Slutsky | A47J 43/20 426/512 |
| 2018/0242783 | A1* | 8/2018 | Zeutzius | A47J 37/0611 |

* cited by examiner

Primary Examiner — Elizabeth M Kerr
(74) Attorney, Agent, or Firm — Kenneth A. Smith (57) ABSTRACT A stuffed waffle utensil and related methods of use that facilitate cooking, removal and handling of a stuffed waffle. The stuffed waffle utensil can include a ring-style utensil having a handle portion and a perimeter ring portion. The perimeter ring portion can define a circular wall between an upper wall surface and a lower surface. The lower surface can define an interior flange and aperture or alternatively, the bottom surface can define a continuous surface defining a grid pattern. The handle portion can be attached to an exterior surface of the circular wall such that it projects outwardly away from the circular wall. The handle portion can define a grip portion intended to make handling easy for a user.

19 Claims, 14 Drawing Sheets

STUFFED WAFFLE UTENSIL

CROSS REFERENCE TO RELATED APPLICATIONS

This application claims priority to U.S. Provisional application 63/038,598 filed on Jun. 12, 2020 which is incorporated herein by reference in its entirety.

TECHNICAL FIELD

The present invention relates generally to utensils for countertop appliances. More specifically, the present invention is directed to a ring-style utensil for facilitating handling of waffles and stuffed waffles made with a countertop appliance and appliances that incorporate such a utensil.

BACKGROUND

Waffles are a popular breakfast item that are formed by cooking a liquid batter to arrive at a cooked item having a recessed grid defined on upper and bottom surfaces of the cooked item. Due to their popularity, a variety of countertop appliances are commercially available to simplify the cooking process and are available for purchase at big box stores as well as online.

While the overall appearance of waffles has not changed significantly, there have been some recent improvements that allow waffles to be filled ("stuffed") and to act essentially as a breakfast sandwich. Using a stuffed waffle maker such as, for example, those disclosed in U.S. Pat. No. 10,485,239, a stuffed waffle having an increased thickness as compared to conventional waffles is cooked around a desired filling material to add additional food items to achieve a desired taste and texture. Representative filling materials could include breakfast meats such as bacon, ham and/or sausage, vegetables such as onions, peppers, and/or mushrooms, cheese, eggs, sweet fillings and the like.

While stuffed waffle makers can make a very desirable food product, the standard recessed grid pattern that makes a waffle instantly identifiable can make the stuffed waffle difficult to remove from the waffle maker once cooking is complete. As such, it would be desirable to improve upon existing stuffed waffle makers to facilitate easier handling and removal of a stuffed waffle following cooking.

SUMMARY

A stuffed waffle utensil of the present invention facilitates easy handling and removal of a stuffed waffle after a cooking process in a stuffed waffle maker. The stuffed waffle utensil can comprise a ring-style utensil including a handle portion and a perimeter ring portion. Generally, the perimeter ring portion can be positioned within a stuffed waffle maker prior to pouring a waffle batter into the stuffed waffle maker. The perimeter ring portion defines a circular wall that defines an upper wall surface and an upper aperture. At a bottom of the circular wall, the circular wall can transition into an interior flanged surface that defines a bottom aperture. In some exemplary embodiments, the bottom of the circular wall can transition into a bottom surface absent any bottom aperture. In some exemplary embodiments, the bottom surface can define a grid pattern across the bottom surface and bounded by the circular wall. In some exemplary embodiments, the ring-style utensil can comprise one or more vertical ribs defined on an interior surface of the circular wall, wherein the vertical ribs extend at least partially between a top and bottom of the circular wall. In some exemplary embodiments, the perimeter ring portion can be fabricated of a non-stick material and/or a material having high levels of heat transfer. The handle portion can be attached to an exterior surface of the circular wall such that it projects outwardly away from the circular wall. The handle portion can define a grip portion intended to make handling convenient for a user. In some exemplary embodiments, the handle portion can be fabricated of a material having reduced levels of heat transfer surface such that the handle portion does not experience the temperatures of the perimeter ring portion.

In another exemplary embodiment, the present invention is directed to a stuffed waffle maker including one or more stuffed waffle utensils. Generally, the stuffed waffle maker can comprise upper and lower heated surfaces, wherein each of these surfaces include one or more waffle cavities. Generally, the stuffed waffle utensil can include a ring portion that can be enclosed within corresponding waffle cavities on the upper and lower heated surfaces to retain liquid waffle batter and a filling material as the batter is cooked and a stuffed waffle is formed. The stuffed waffle utensil can include a handle portion that allows a user to remove the stuffed waffle from the stuffed waffle maker, whereby the user can remove the stuffed waffle from the ring portion prior to consumption of the stuffed waffle.

In yet another exemplary embodiment, the present invention is directed to a method of forming a stuffed waffle. The method can comprise positioning a stuffed waffle utensil having a ring portion relative to a stuffed waffle maker such that the ring portion resides at a perimeter of a lower waffle cavity on a lower heated surface of the stuffed waffle maker. The method can further comprise pouring a waffle batter onto the lower waffle cavity whereby the ring portion retains the batter in the lower waffle cavity. The method can further comprise placing a filling material on top of the batter. The method can further comprise pouring the batter over the filling material such that the ring portion is filled substantially to a top edge. The method can further comprise positioning an upper heated surface of the stuffed waffle maker such that a corresponding upper waffle cavity covers the ring portion such that the ring portion is fully enclosed by the combination of the upper and lower waffle cavities. The method can further comprise cooking the waffle batter within the ring portion. The method can further comprise removing the stuffed waffle utensil from the stuffed waffle maker using a handle portion on the stuffed waffle utensil. Finally, the method can comprise inverting the stuffed waffle utensil to remove a cooked stuffed waffle from the ring portion of the stuffed waffle utensil.

The above summary is not intended to describe each illustrated embodiment or every implementation of the invention. Rather, the exemplary embodiments are chosen and described so as to provide an overview or framework for understanding the nature and character of the claimed aspects and implementations so that those skilled in the art can appreciate and understand the principles and practices of the invention. The Figures and the detailed description that follow more particularly exemplify these exemplary embodiments, and are incorporated in and constitute a part of this specification.

BRIEF DESCRIPTION OF THE DRAWINGS

These and other features and advantages of the present invention will become better understood with regard to the following description and accompanying drawings in which.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Exemplary embodiments of a stuffed waffle utensil 100 are illustrated in FIGS. 1-5. Generally, stuffed waffle utensil 100 comprises a body 102 defining a handle portion 104 and a ring portion 106. In some embodiments, body 102 can comprise a homogenous assembly, wherein the handle portion 104 and ring portion 106 are integral to one another and are formed of a metallic material providing a high level of heat transfer. Alternatively, the handle portion 104 and ring portion 106 can comprise distinct pieces that are operably coupled to define the body 102. In some exemplary embodiments, the handle portion 104 can be fabricated of a material having lower levels of heat transfer than the material selected for the ring portion 106.

Referring again to FIGS. 1-5, ring portion 106 can comprise a circular wall 110 having a wall height 112 defined between an upper edge 114 and a lower surface 116. Circular wall 110 includes an inner wall surface 118 and an outer wall surface 119. Upper edge 114 defines an upper aperture 120. Lower surface 116 can transition into a lower interior flanged surface 122 that defined a lower aperture 124. Due to the presence of the lower interior flanged surface 122, lower aperture 124 will generally have a smaller diameter than the upper aperture 120. Generally, the area encompassed by the circular wall 110 defines a cooking volume 126 that will ultimately determine the size of a stuffed waffle cooked within the ring portion 106.

Handle portion 104 can include a handle body 130 defining a gripping end 132 and an attachment end 134 as seen in FIGS. 1-5. Generally, attachment end 134 is attached to the outer wall surface 119 proximate the upper edge 114. In the exemplary embodiment illustrated in FIG. 4, the handle portion 104 is attached to a handle anchor 142 which is formed in the circular wall 110. In the illustrated embodiment, the handle portion 104 is affixed to the handle anchor 142 with a screw 144 however, exemplary embodiments may employ other types of fasteners such, but not limited to, rivets, clips, pins, or staking. This type of mounting arrangement may serve to reduce the amount of heat transferred from the circular wall 110 to the handle portion 104 so as to reduce the risk of a user burning themselves because of the heat of the handle. In some exemplary embodiments, the handle portion 104 may include a handle sleeve 204. In certain exemplary embodiments, the handle sleeve 204 or handle portion 104 may include projections 146 that serve to prevent or discourage a user from gripping the handle portion 104 near to the circular wall 110 or unprotected area of the handle, potentially causing burns to the user's hands. Gripping end 132 can include one or more gripping features 136 for example, a flat portion 138 that allows a user to easily grasp and manipulate the stuffed waffle utensil 100.

Figure 1:
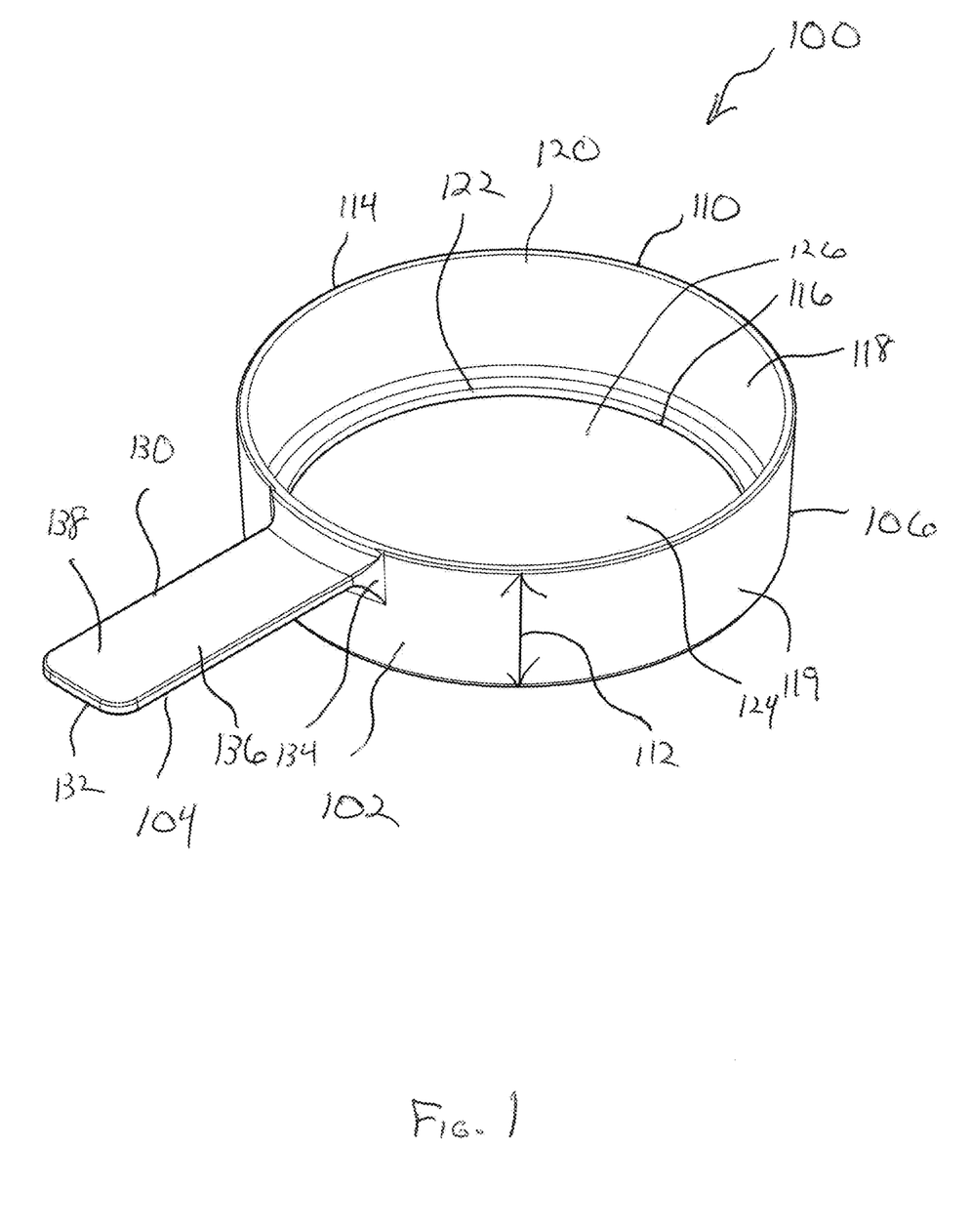
FIG. 1 is a top, perspective view of a stuffed waffle utensil according to an exemplary embodiment.
Figure 2:
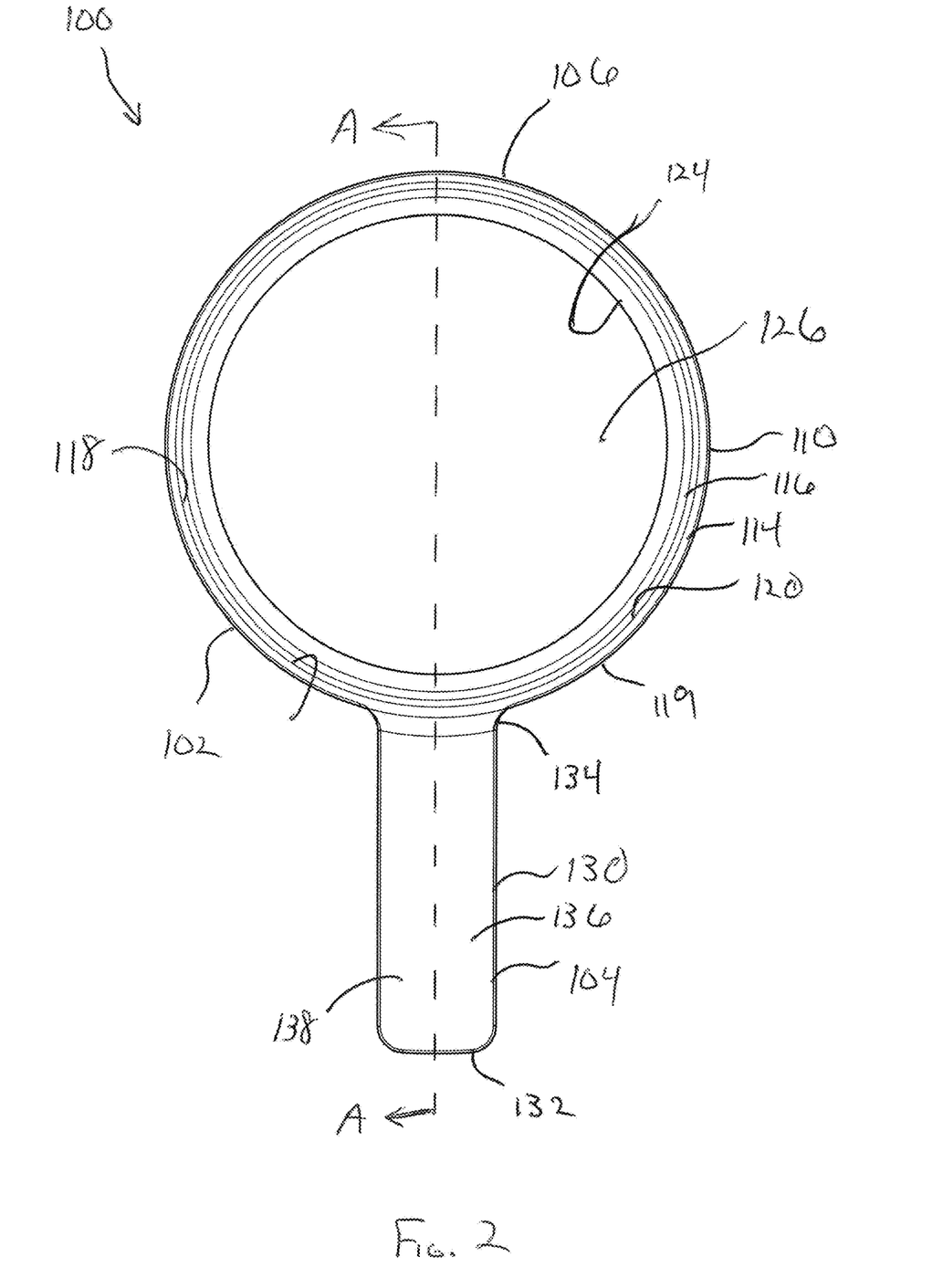
FIG. 2 is a top view of the stuffed waffle utensil of FIG. 1.
Figure 3:
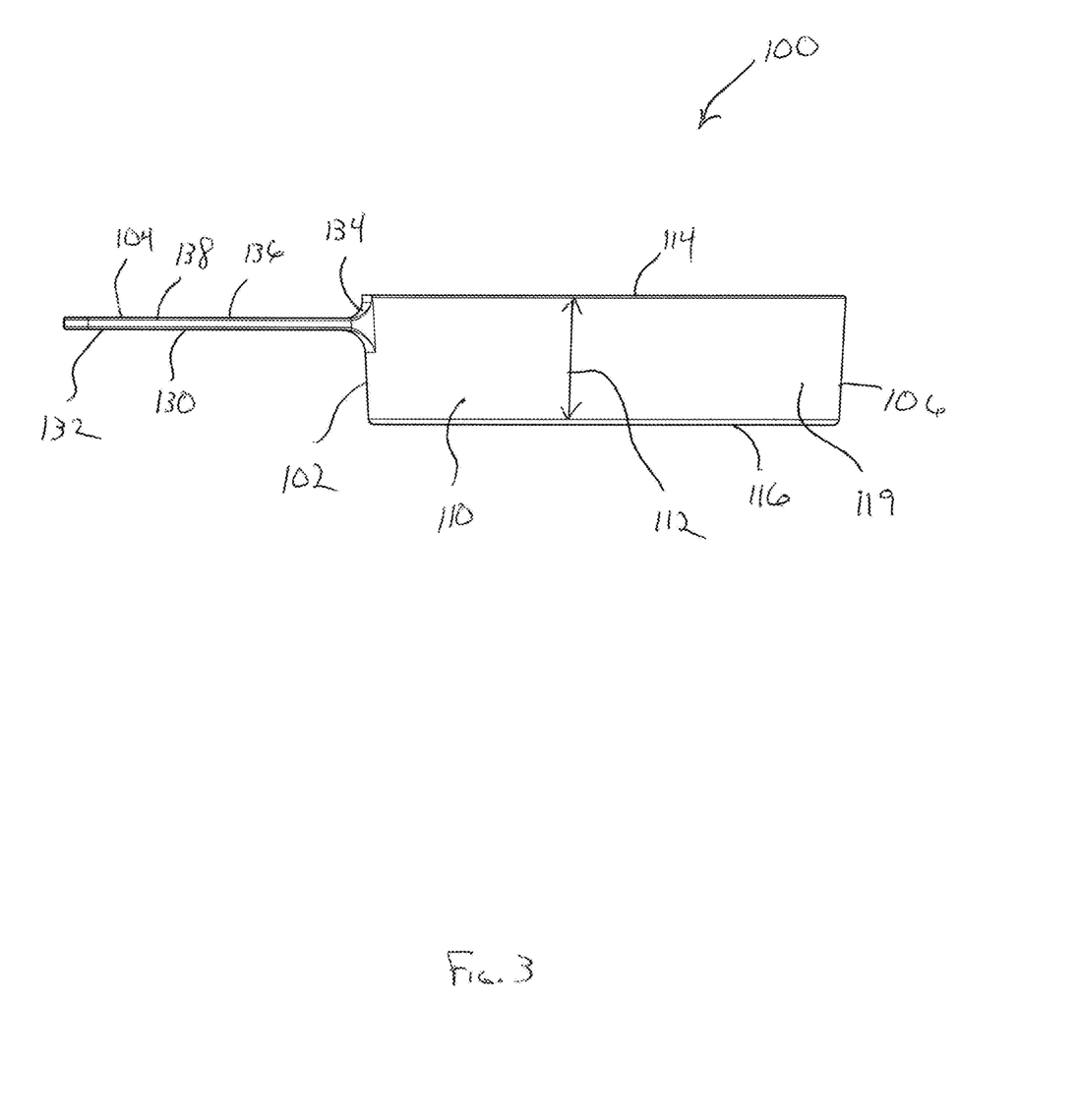
FIG. 3 is a side view of the stuffed waffle utensil of FIG. 1.
Figure 4:
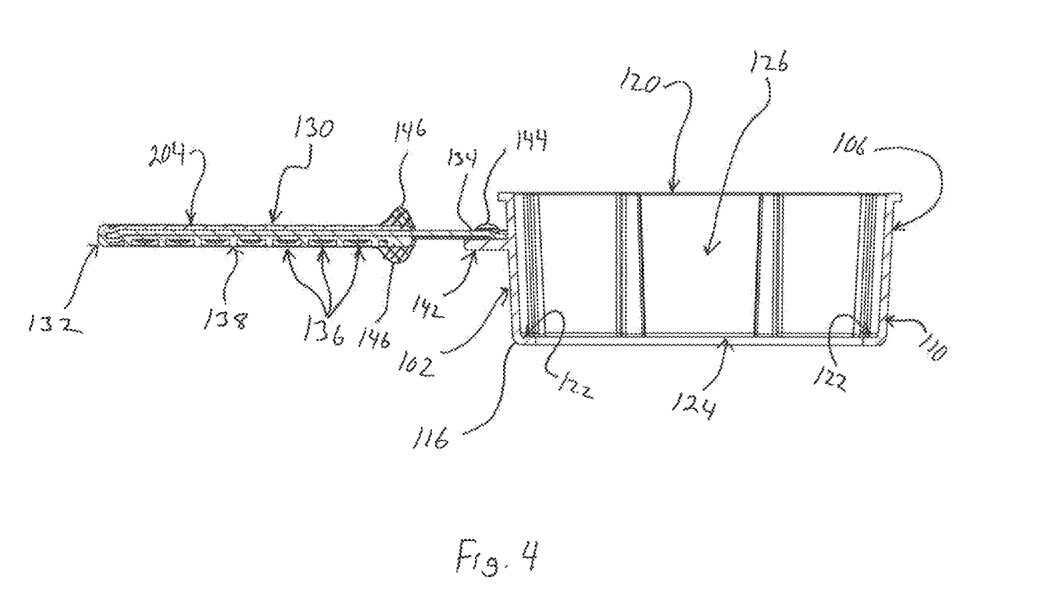
FIG. 4 is a section view of an exemplary stuffed waffle utensil.
Figure 5:
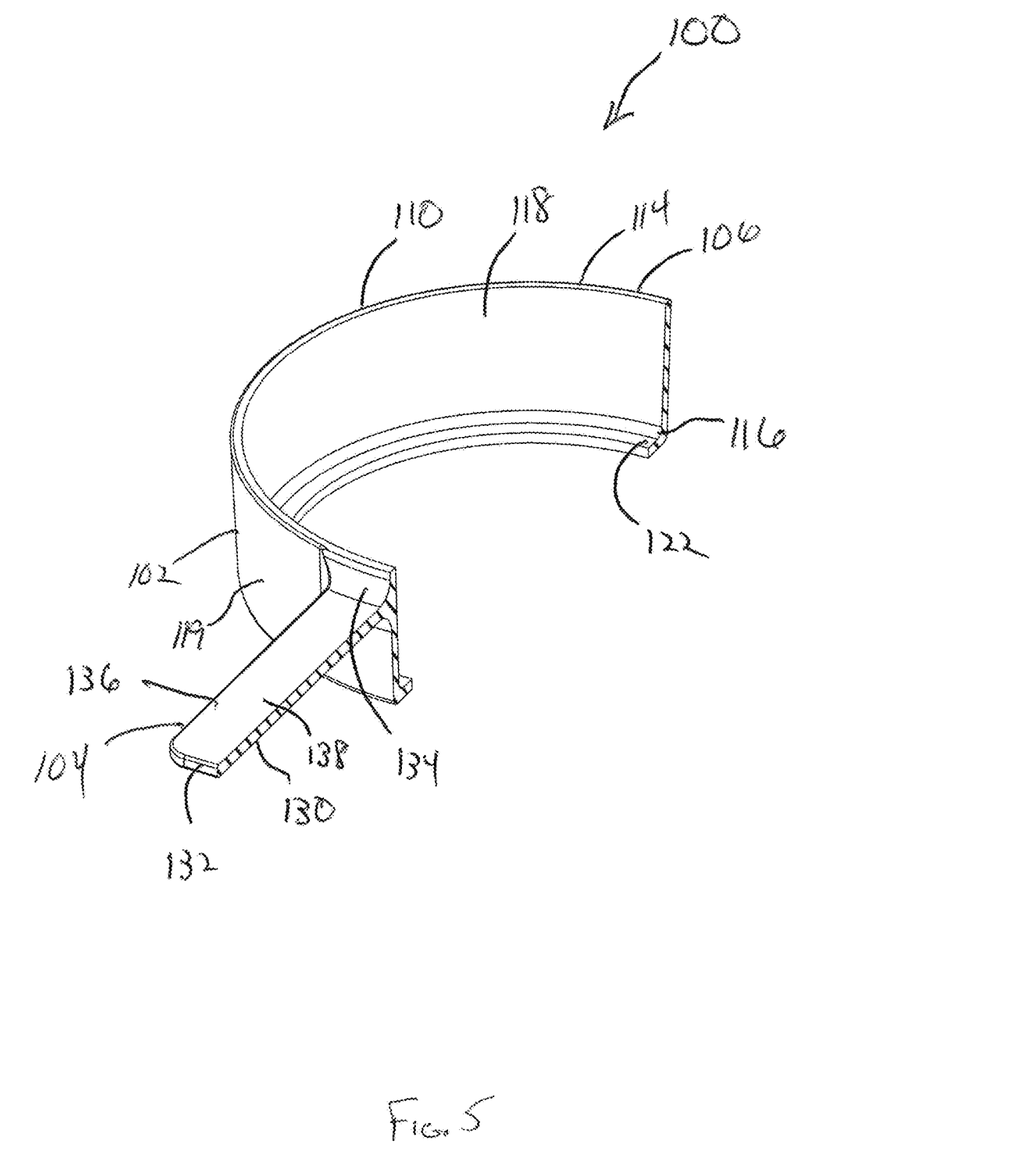
FIG. 5 is a top, perspective, section view taken at line A-A of FIG. 1 of the stuffed waffle utensil of FIG. 1.
Figure 6:
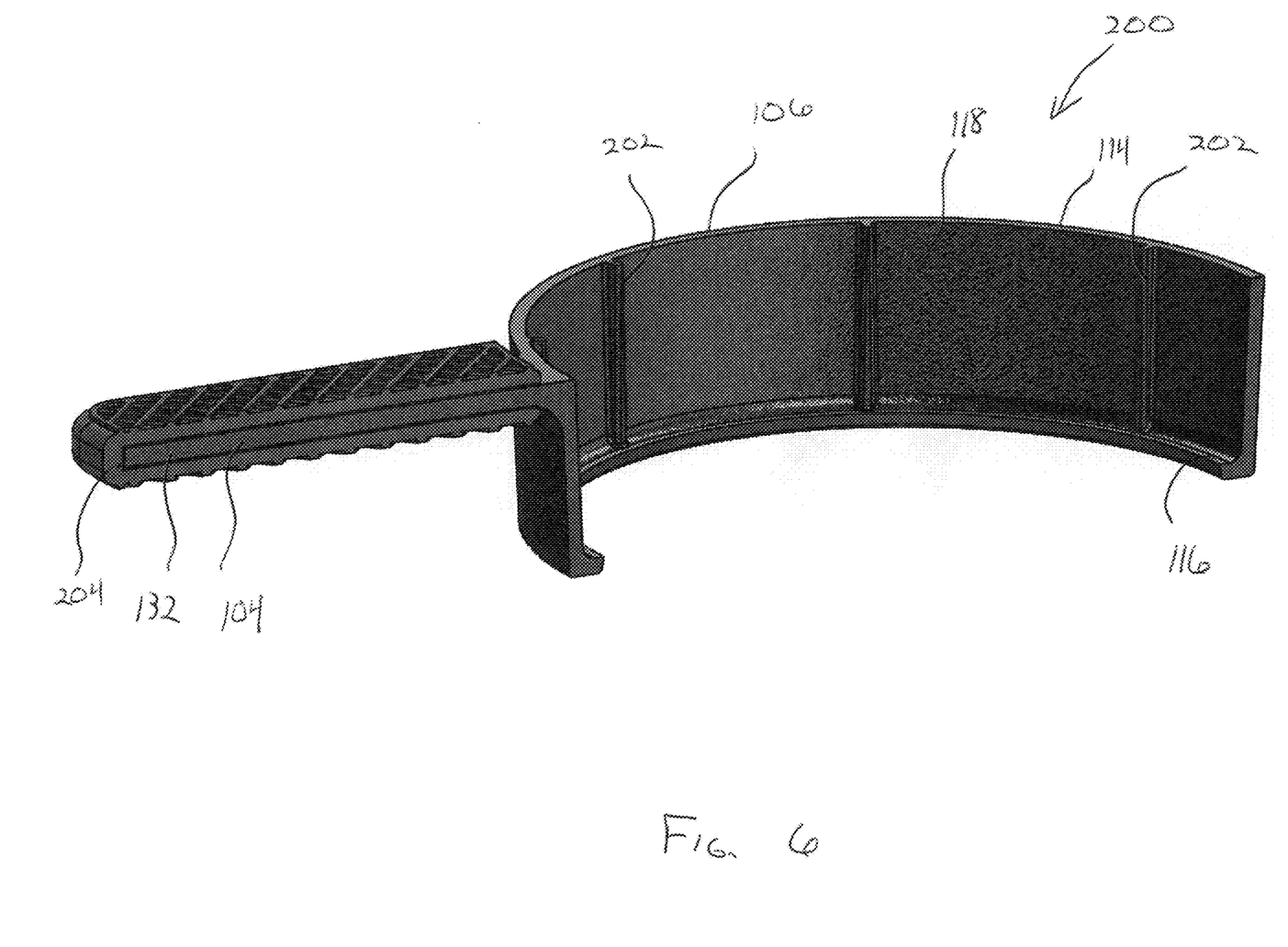
FIG. 6 is a top, perspective, section view of a stuffed waffle utensil according to an exemplary embodiment.

As seen in FIG. 6, another exemplary embodiment of a stuffed waffle utensil 200 can comprise a ring portion 106. The ring portion 106 including one or more vertical ribs 202 that extend, at least partially, along the inner wall surface 118 between the upper edge 114 and lower surface 116. Furthermore, stuffed waffle utensil 200 can comprise a handle portion 104, wherein the gripping end 132 is enclosed within a handle sleeve 204. Handle sleeve 204 can comprise a material resistant to heat transfer, for example, a polymeric or rubber-like material that allows a user to interact with the gripping end 132 without being exposed to elevated temperatures. Furthermore, the material of handle sleeve 204 can provide non-slip properties that enhance a user's ability to manipulate the stuffed waffle utensil 200 during use.

Figure 7A:
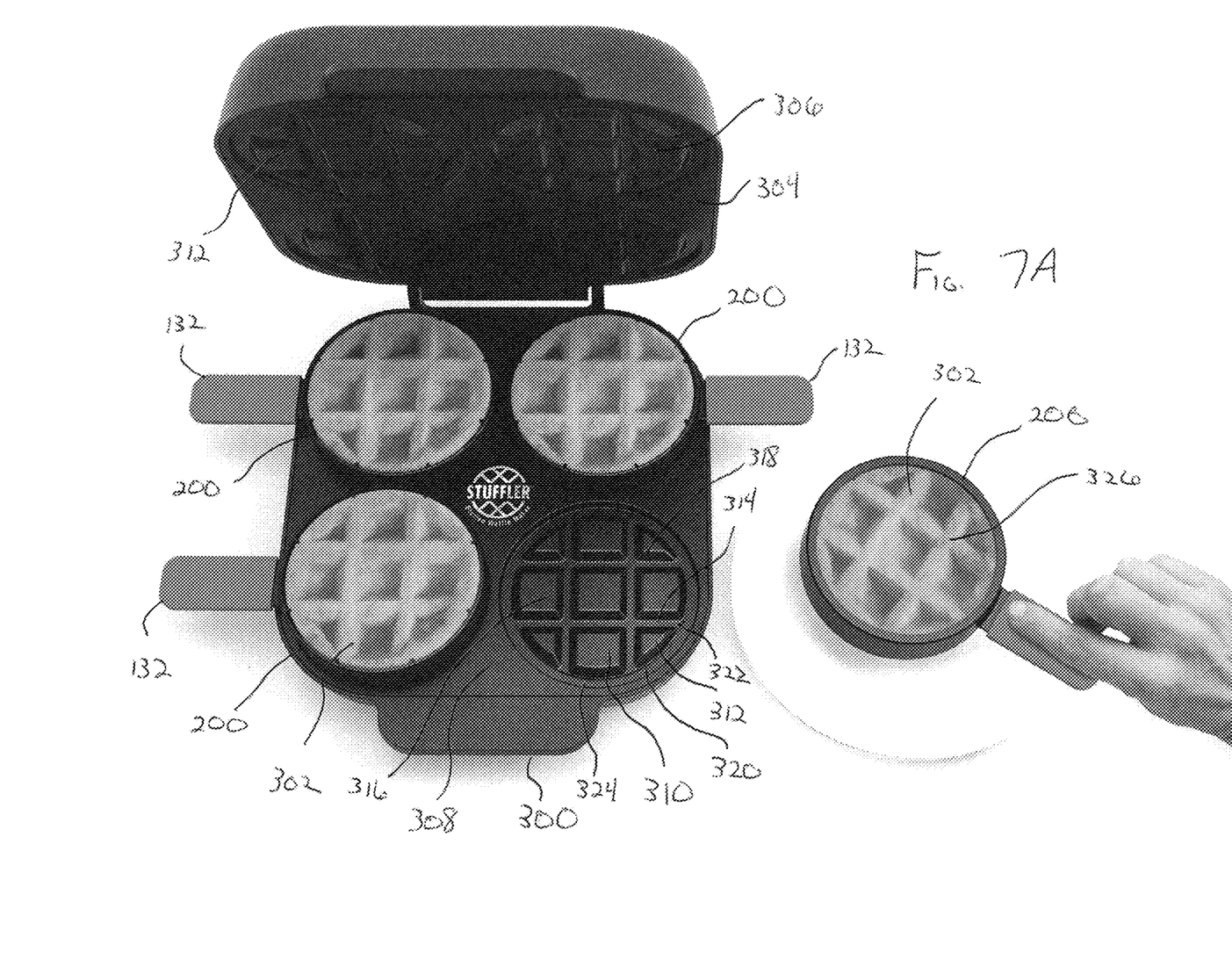
FIG. 7A is a top view of an exemplary stuffed waffle maker utilizing the stuffed waffle utensil of FIG. 6.
Figure 7B:
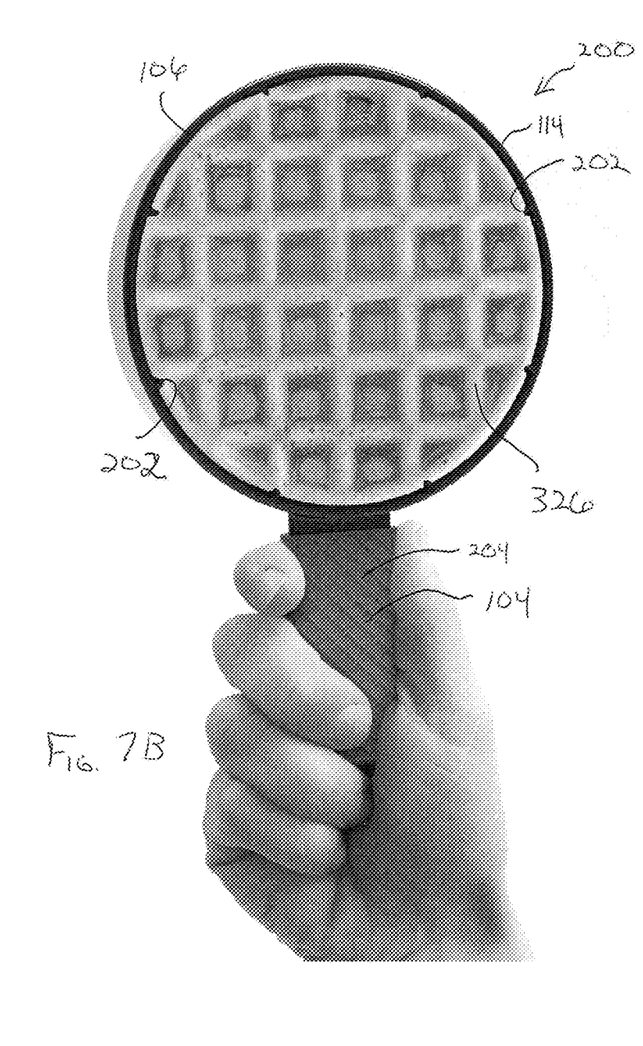
FIG. 7B is a top view of the stuffed waffle utensil of FIG. 6 retaining a cooked stuffed waffle.
Figure 7C:
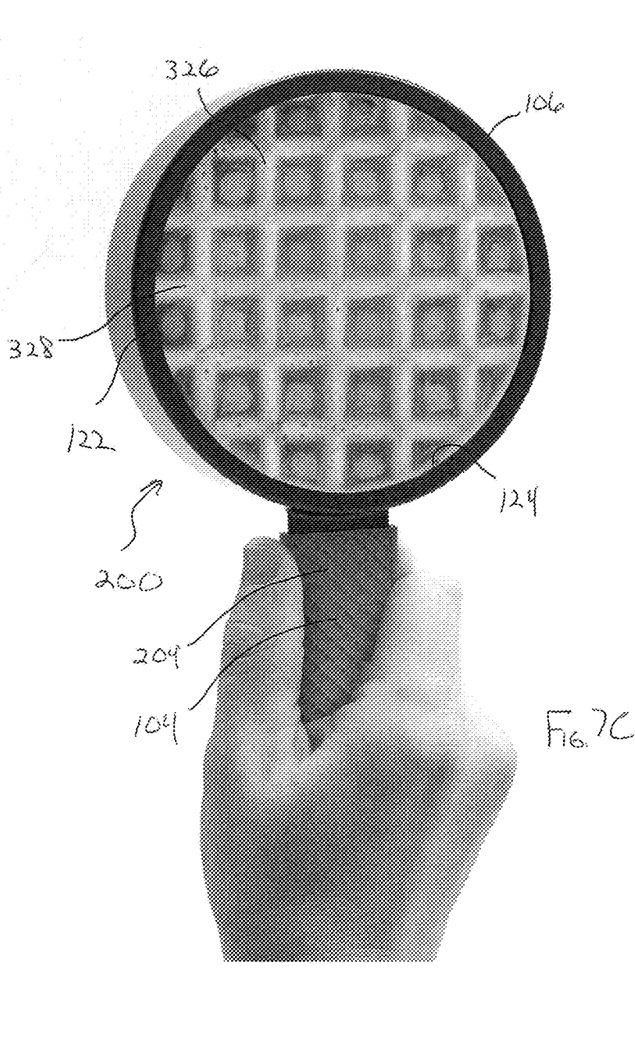
FIG. 7C is a bottom view of the stuffed waffle utensil of FIG. 6 retaining a cooked stuffed waffle.

Referring now to FIG. 7A, the stuffed waffle utensil according to an exemplary embodiment, for example the stuffed waffle utensil 200, can be utilized with a stuffed waffle maker 300 to form one or more stuffed waffles 302. Generally, the stuffed waffle maker 300 can include an upper heated surface 304 having one or more upper waffle cavities 306 and a lower heated surface 308 having one or more lower waffle cavities 310. Each of the upper waffle cavities 306 and lower waffle cavities 310 can includes a grid-surface 312 formed of alternating elevated ridges 314 and sunken cavities 316 such that the grid-surface 312 defines a conventional waffle pattern 318. In some exemplary embodiments, the lower waffle cavities 310 can comprise a removable insert member 320, wherein the grid-surface 312 is defined on an upper portion 322 of the removable insert member 320. When using the removable insert member 320, the lower waffle cavity 310 will generally define a cavity having a flat receiving surface adapted for placement of the removable insert member 320. The use of removable insert member 320 can provide additional capability to the stuffed waffle utensil 200, for example, by providing for easy removal and cleaning of the grid-surface 312 and by providing a flat surface within the lower waffle cavity 310 that allows for the cooking of other food items, for example eggs, that would be difficult to remove from the grid-surface 312.

To utilize stuffed waffle utensils according to exemplary embodiments, a user can first position a stuffed waffle utensil, for example the stuffed waffle utensil 200, such that the lower surface 116 sits on and surrounds a cavity perimeter 324 of the lower waffle cavity 310 as seen in FIG. 7A. Due to the wall height 112, the upper edge 114 extends above the lower heated surface 308. Next, a user can begin pouring a waffle batter (not illustrated) into the ring portion 106 such that the grid-surface 312 of the lower waffle cavity 310 is covered or otherwise filled with the waffle batter. Next, a user can place a desired filling material, for example, meats, vegetables, cheeses, or sweet fillings such as jelly or frosting, into the ring portion 106 such that the filling material resides on top of the batter present in the lower waffle cavity 310. With the filling material in position, the user then pours additional waffle batter into the ring portion 106 such that the ring portion 106 is filled to the upper edge 114 and the filling material is completely covered. At this point, the user lowers the upper heated surface 304 such that the corresponding upper waffle cavity 306 covers the upper edge 114 and the ring portion 106 is completely enclosed by the combination of the corresponding upper and lower waffle cavities (306 and 310). With the ring portion 106 retained in the stuffed waffle maker 300, the gripping end 132 extends outward from the stuffed waffle maker 300 in an exemplary embodiment.

With the upper waffle cavity 306, the lower waffle cavity 310 and the ring portion 106 cooperatively retaining the waffle batter and filling material, heat from the upper heated surface 304 and lower heated surface 308 causes the waffle batter to cook and form a stuffed waffle 326 after a sufficient cooking time. With cooking complete, the user lifts the upper heated surface 304 off of the ring portion 106. Using the gripping end 132, the user then lifts the stuffed waffle utensil 200 as well as the stuffed waffle 326 within the ring portion 106, off of the lower waffle cavity 310. Stuffed waffle 326 essentially resides on the lower interior flanged surface 122 as the stuffed waffle utensil 200 is lifted such that the stuffed waffle 326 is prevented from falling through the lower aperture 124. The user rotates the stuffed waffle utensil 200 upside down such that the lower aperture 124 is facing upward and then presses downward on an exposed surface 328 of the stuffed waffle 326, whereby the stuffed waffle 326 is directed out of the ring portion 106 and is ready for consumption by the user.

Figure 8:
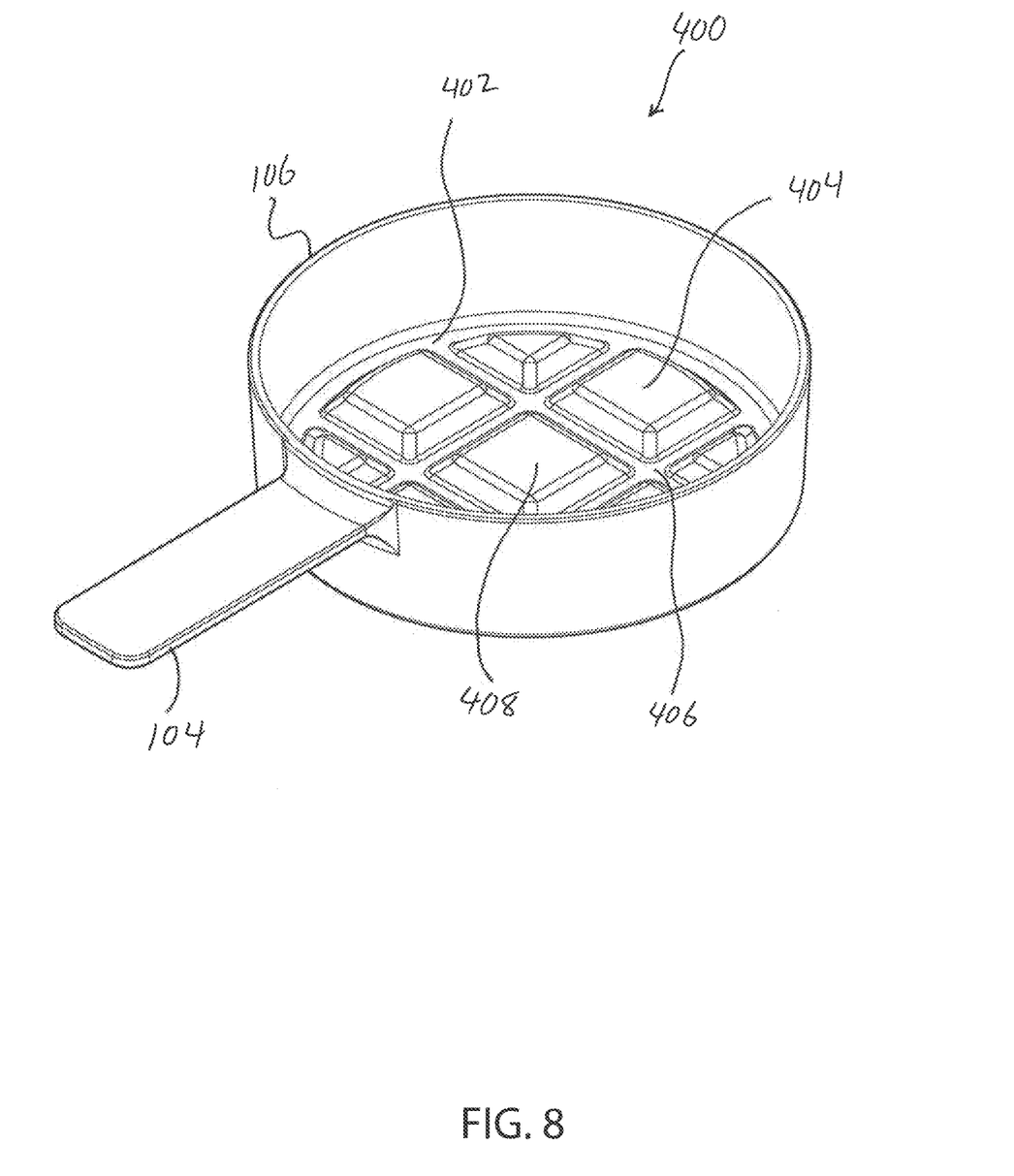
FIG. 8 is a top, perspective view of a stuffed waffle utensil according to an exemplary embodiment.
Figure 9:
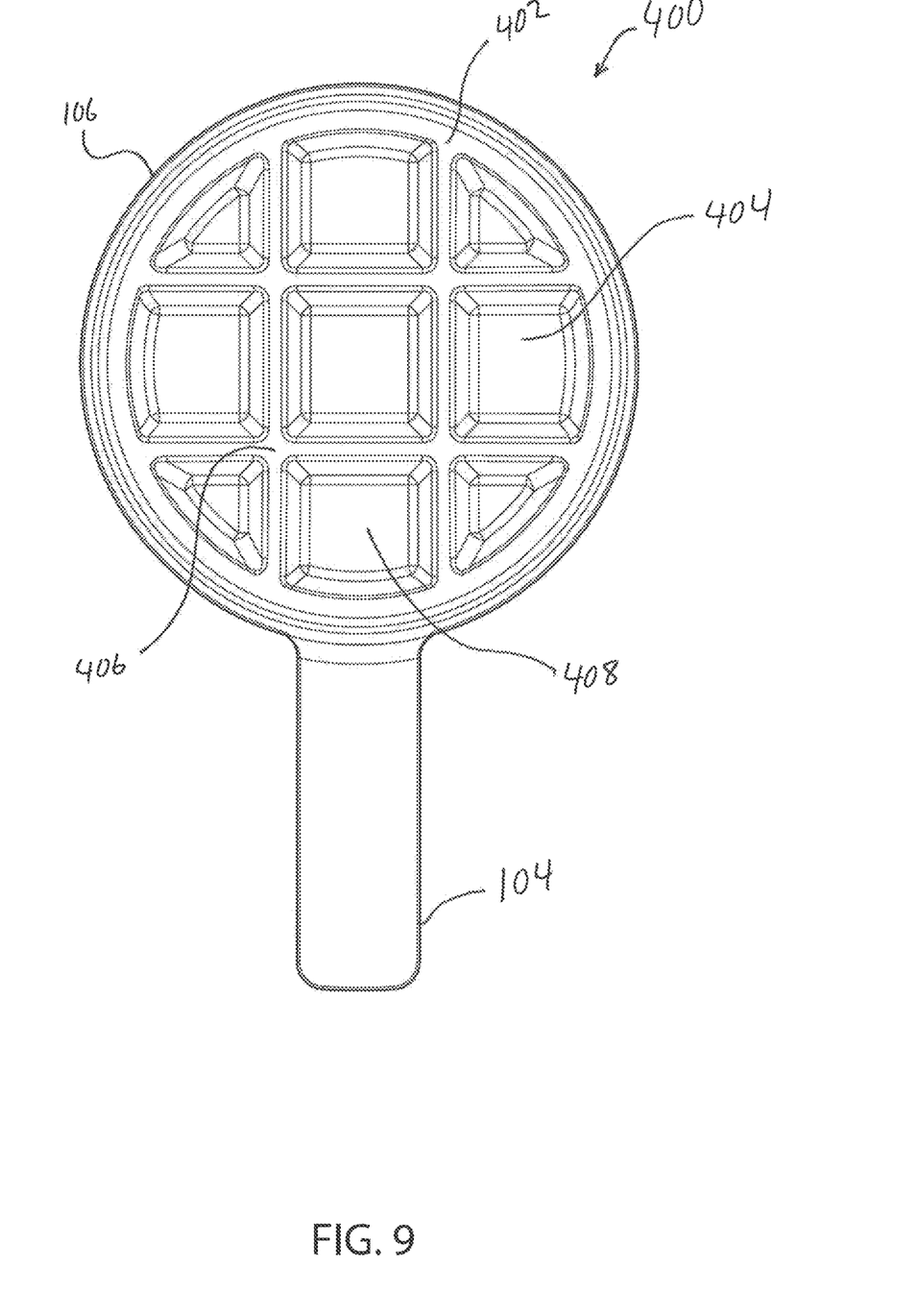
FIG. 9 is a top view of the stuffed waffle utensil of FIG. 8.

In another exemplary embodiment of a stuffed waffle utensil 400 shown in FIGS. 8 and 9, the lower surface 116, lower interior flanged surface 122, and lower aperture 124 are replaced with a lower cooking surface 402 having an integral grid surface 404 defined by recessed channels 406 and elevated protrusions 408. With an integral grid surface 404, the lower waffle cavity 310 can again define a flat receiving surface adapted for placement of the stuffed waffle utensil 400. The use of integral grid surface 404 provides additional capability to the stuffed waffle maker 300 by allowing for the cooking of other food items within the lower waffle cavity 310 that do not have a conventional waffle grid finish and by allowing the integral grid surface 404 to be removed from the stuffed waffle maker 300 for cleaning.

Figure 10:
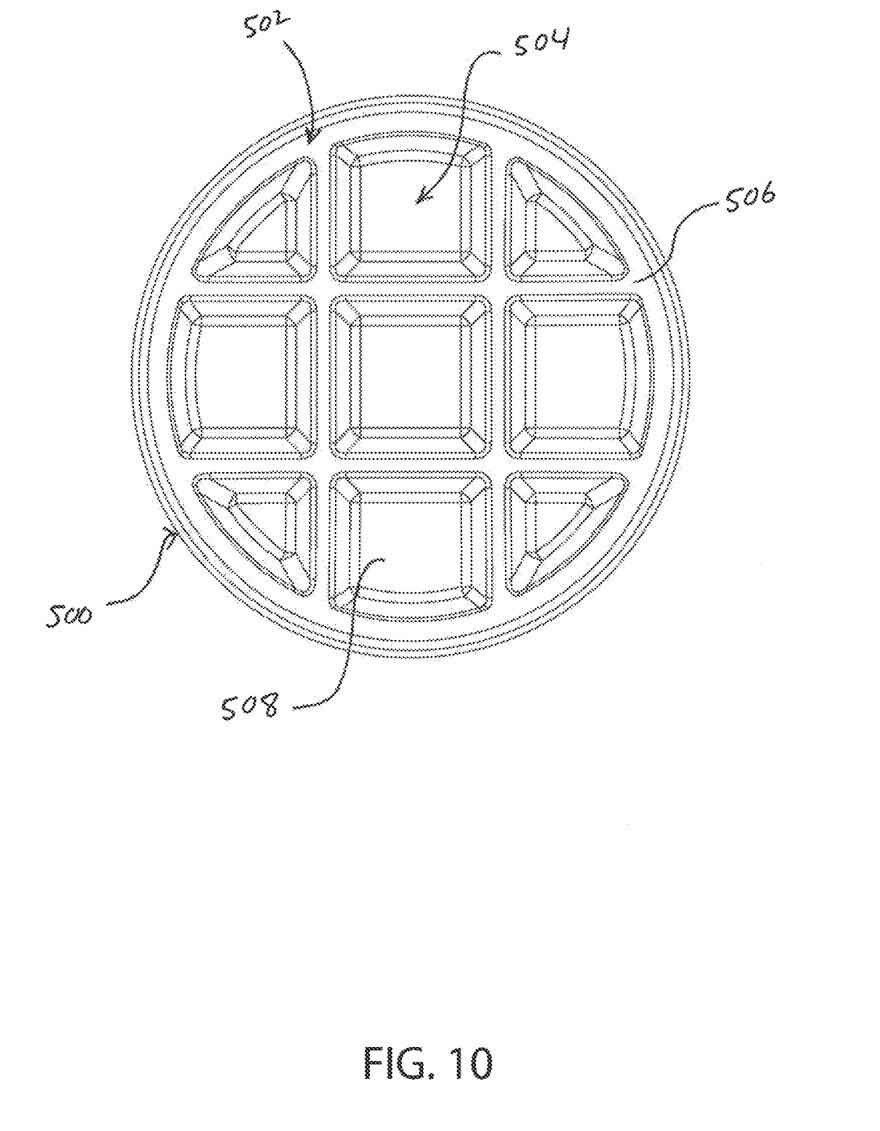
FIG. 10 is a top view of a removable insert member for use in a stuffed waffle maker according to an exemplary embodiment.
Figure 11:
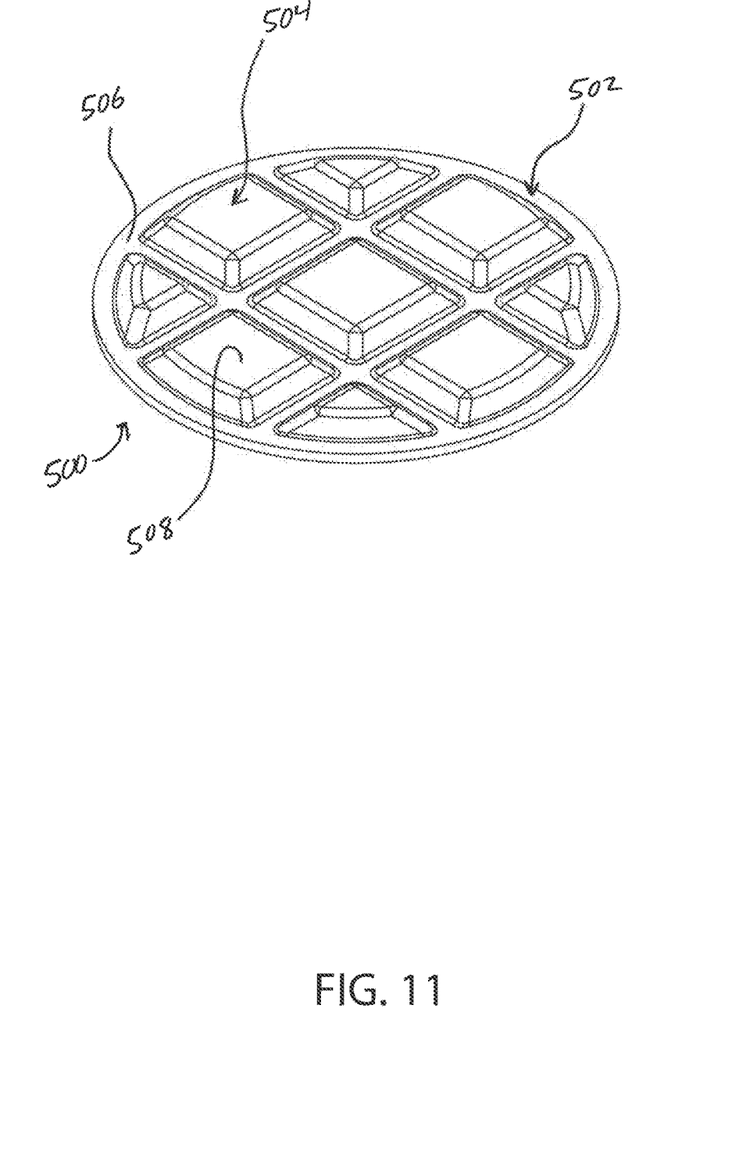
FIG. 11 is a top, perspective view of the removable insert of FIG. 10.

FIGS. 10 and 11 illustrate an exemplary embodiment of an insert member 500 for use with a stuffed waffle maker 300 such as illustrated in FIG. 7A. As illustrated, in FIGS. 10 and 11, an exemplary embodiment of an insert member 500 comprises an upper surface 502, in which is formed a grid-surface 504. As shown, the grid-surface 504 comprises a plurality of sunken channels 506 and elevated protrusions 508. In other exemplary embodiments, the grid surface 504 may comprise ridges and depressions to form variety of surface patterns on a stuffed waffle formed by a stuffed waffle maker 300. It should be understood that the patterns illustrated in the various embodiments disclosed herein are only exemplary and the claimed invention should not be limited to those exemplary patterns shown.

Figure 12:
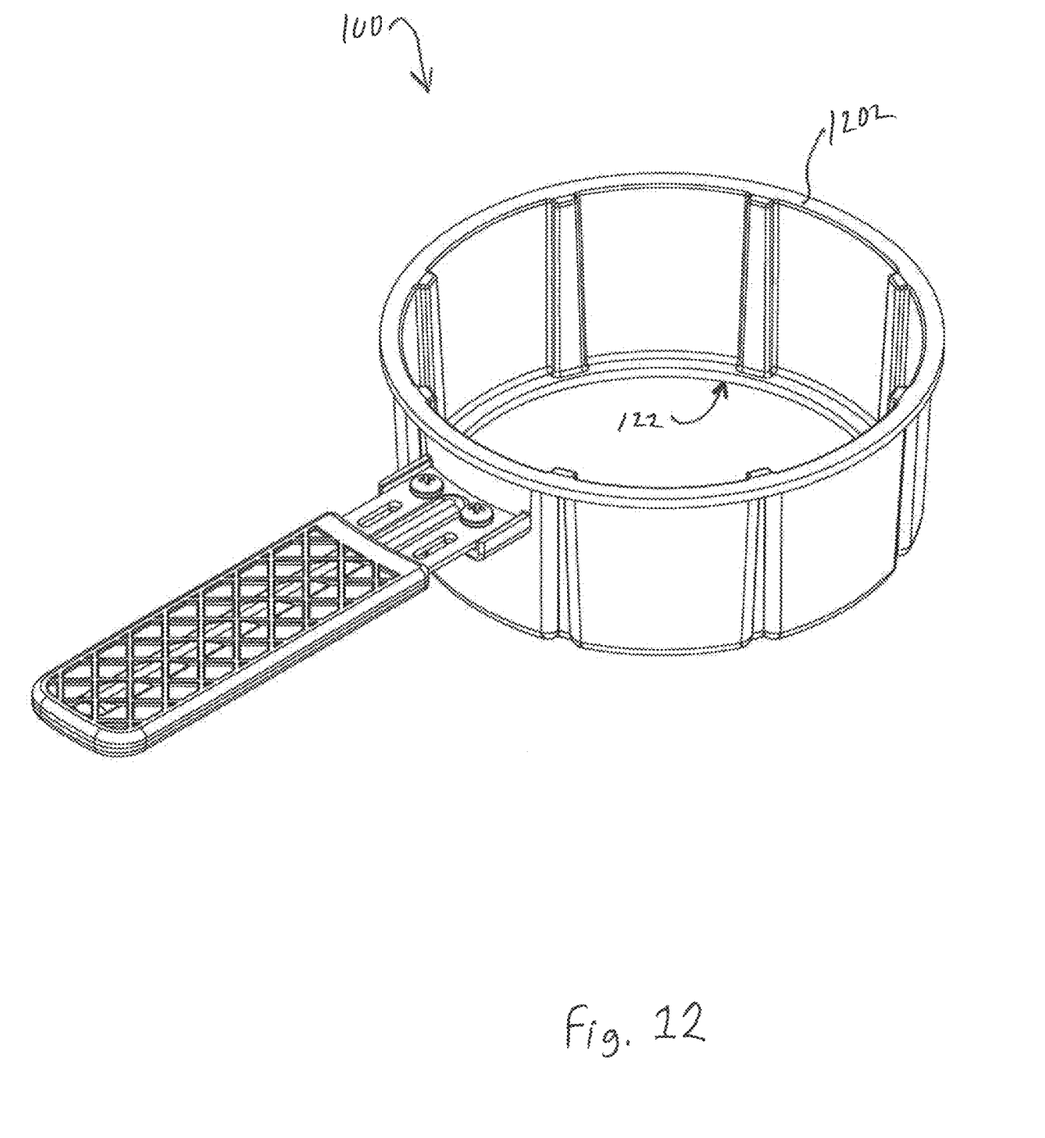
FIG. 12 is top, perspective view of a stuffed waffle utensil according to an another exemplary embodiment.
Figure 13:
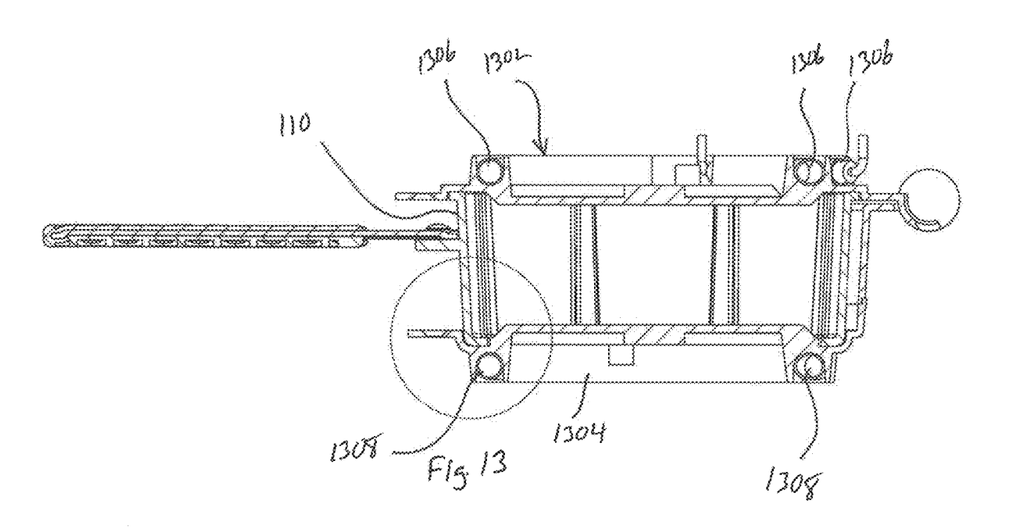
FIGS. 13 and 13A are section views of a partial waffle appliance incorporating a stuffed waffle utensil according to an exemplary embodiment.
Figure 13A:
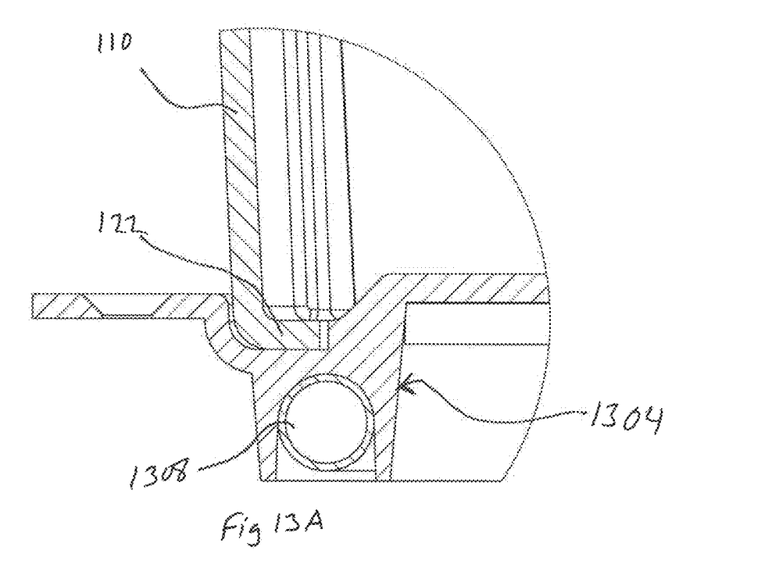

As is shown in FIG. 12, in certain exemplary embodiments, a stuffed waffle utensil 100 may comprise an upper flange 1202 in addition to the lower flange 122. As was discussed herein, the lower flange 122 may facilitate removal of the stuffed waffle utensil 100 from a waffle maker with the cooked waffle being retained by the lower flange 122 while the stuffed waffle utensil 100 is removed from the upper and lower plates of the waffle maker. Referring to FIG. 13, exemplary embodiments of a waffle maker that utilizes a stuffed waffle utensil 100 as illustrated in FIG. 12 comprise an upper plate 1302 and a lower plate 1304. The upper and lower plates may comprise a waffle grid as illustrated elsewhere herein or may have variations of grid patterns, or in certain exemplary embodiments, may have no grid pattern and thus comprise a substantially flat surface. As shown, the upper plate 1302 may comprise a heating element 1306 that heats the upper plate 1302. The lower plate 1304 is similarly configured with a heating element 1308 to heat the lower plate 1304. In order to cook waffle batter that has been introduced into a space formed by the waffle utensil 100, the upper plate 1302, and lower plate 1304, the circular wall 100 must also be heated. As illustrated in the enlarged view of FIG. 13A, in order to facilitate this heating, the upper flange 1202 and lower flange 122 are placed in contact with the upper plate 1302 and lower plate 1304 respectively. An enlarged view of the interface between the lower flange 122 and the lower plate 1304 is shown in FIG. 13A. The use of a flange shape provides a greater area of contact between the circular wall 100 and the upper plate 1302 and the lower plate 1304 such that a greater level of heat transfer between the plates and the circular wall 100 is realized. This greater level of heat transfer serves to enhance the ability of the circular wall to cook the waffle batter that is in contact with its inner wall surface 118. The result is a browning or toasting of the waffle surface, resulting in a more visually appealing and crispy waffle.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

Any implementation or embodiment disclosed herein can be combined with any other implementation or embodiment, and references to "an implementation," "some implementations," "one implementation," "an embodiment," "some embodiments," "certain embodiments," or the like are not necessarily mutually exclusive and are intended to indicate that a particular feature, structure, or characteristic described in connection with the implementation can be included in at least one implementation or embodiment. Such terms as used herein are not necessarily all referring to the same implementation. Any implementation or embodiment can be combined with any other implementation or embodiment, inclusively or exclusively, in any manner consistent with the aspects and implementations disclosed herein.

Where technical features in the drawings, detailed description or any claim are followed by reference numbers, the reference numbers have been included to increase the intelligibility of the drawings, detailed description, and claims. Accordingly, neither the reference numbers nor their absence have any limiting effect on the scope of any claim elements.

References herein to the positions of elements (e.g., "top," "bottom," "above," "below") are merely used to describe the orientation of various elements in the Figures. The orientation of various elements may differ according to other exemplary embodiments, and that such variations are intended to be encompassed by the present disclosure.

What is claimed is:

1. A device for making stuffed waffles comprising:
a perimeter ring portion comprising an unbroken circular wall, the circular wall defining an upper wall surface which transitions into an exterior flange, the circular wall surface defining an upper aperture, the circular wall surface further defining a bottom wall surface which transitions into an interior flange surface, the interior flange surface adapted to retain a stuffed waffle extending to a periphery of the circular wall during a cooking process;
the perimeter ring portion further comprising an exterior flange surface opposing the interior flange surface, the exterior flange surface sized to reside in a channel formed in a heated surface upon which the perimeter ring portion rests during a process of making stuffed waffles, the channel located adjacent to a heating element portion of the heated surface, and
a handle portion affixed to the perimeter ring portion.

2. The device of claim 1, wherein the interior flange surface defines a bottom aperture.

3. The device of claim 1, wherein the bottom of the circular wall transitions into a bottom surface absent any bottom aperture, the bottom surface defines a grid pattern across the bottom surface and bounded by the circular wall.

4. The device of claim 1, wherein, the ring-portion comprises one or more vertical ribs defined on an interior surface of the circular wall, wherein the vertical ribs extend at least partially between a first edge and a second edge of the circular wall.

5. The device of claim 1, wherein, the perimeter ring portion can be fabricated of a non-stick material.

6. The device of claim 1, wherein the handle portion is attached to an exterior surface of the circular wall such that the handle portion projects outwardly away from the circular wall.

7. The device of claim 1, wherein the exterior surface of the circular wall comprises a handle anchor to which the handle portion is attached directly to the exterior surface of the circular wall with at least one fastener.

8. The device of claim 1, wherein the handle portion further comprises a grip portion which provides non-slip properties.

9. The device of claim 1, wherein, the handle portion is fabricated from a material having reduced levels of heat transfer relative to the circular wall portion.

10. A stuffed waffle maker comprising:
an upper heated surface and a lower heated surface, the upper heated surface comprising a first heating element positioned adjacent to a perimeter channel formed in the upper heated surface and the lower heated surface comprising a second heating element positioned adjacent to a perimeter channel formed in the lower heated surface, the lower surface hingedly attached to the upper heated surface, wherein each of these surfaces comprises one or more waffle cavities; and
one or more waffle utensils, the waffle utensils comprising:
a perimeter ring portion that can be enclosed within corresponding waffle cavities on the upper heated surface and the lower heated surface, the perimeter ring portion comprising a continuous circular wall that defines an upper wall surface which transitions into an exterior flange, an upper aperture, the circular wall surface further defining a bottom wall surface which transitions into an interior flange surface, the interior flange surface adapted to retain a stuffed waffle extending to a periphery of the circular wall during a cooking process, the perimeter ring portion comprising an exterior flange surface opposing the interior flange surface, the exterior flange surface configured such that it is inserted into the perimeter channel formed in the lower heated surface; and
a handle portion affixed to the perimeter ring portion.

11. The stuffed waffle maker of claim 10, wherein each of the upper heated surface and the lower heated surfaces comprise at least two waffle discrete cavities.

12. The stuffed waffle maker of claim 10, further comprising one or more insert members which are configured to rest in one of the one or more waffle cavities.

13. The stuffed waffle maker of claim 12, wherein the insert members comprise an upper surface which is formed with a grid surface.

14. The device of claim 10, wherein the interior flange surface defines a bottom aperture.

15. The device of claim 10, wherein the bottom of the circular wall transitions into a bottom surface absent any bottom aperture.

16. The device of claim 15, wherein, the bottom surface defines a grid pattern across the bottom surface and bounded by the circular wall.

17. The device of claim 10, wherein the exterior surface of the circular wall comprises a handle anchor to which the handle portion is attached with at least one fastener and the handle portion is fabricated from a material having reduced levels of heat transfer relative to the circular wall portion.

18. The device of claim 10, wherein, the ring-portion comprises one or more vertical ribs defined on an interior surface of the circular wall, wherein the vertical ribs extend at least partially between a first edge and a second edge of the circular wall.

19. A method of making a stuffed waffle comprising:
heating a first surface and a second surface hingedly attached to the first heated surface, wherein each of these surfaces comprises one or more waffle cavities;
placing a waffle utensil into one of the waffle cavities of the second surface, the waffle utensil comprising:
a perimeter ring portion, the perimeter ring portion comprising a continuous circular wall that defines an upper wall surface, the upper wall surface comprising an exterior flange, an upper aperture, the circular wall surface further defining a bottom wall surface which transitions into an interior flange surface, the interior flange surface adapted to retain a stuffed waffle extending to a periphery of the circular wall during a cooking process, the perimeter ring portion comprising an exterior flange surface opposing the interior flange surface where placing the waffle utensil into one of the waffle cavities of the second heated surface causes the exterior flange surface to be inserted into a perimeter channel formed in the second heated surface adjacent to a heating element located at the second heated surface such that the circular wall is heated by the heating element; and
a single handle portion affixed to the perimeter ring portion;
introducing a first amount of batter into the waffle utensil;
positioning a filling material on the first amount of batter;
introducing a second amount of batter into the waffle utensil such at the filling material is covered by the second amount of batter;
positioning the first surface such that a waffle cavity of the first surface contacts the upper wall surface of the perimeter ring portion of the waffle utensil; and
allowing the heated first surface, the circular wall, and the heated second surface to cook the first and second amounts of batter.

* * * * *